Nov. 13, 1928.

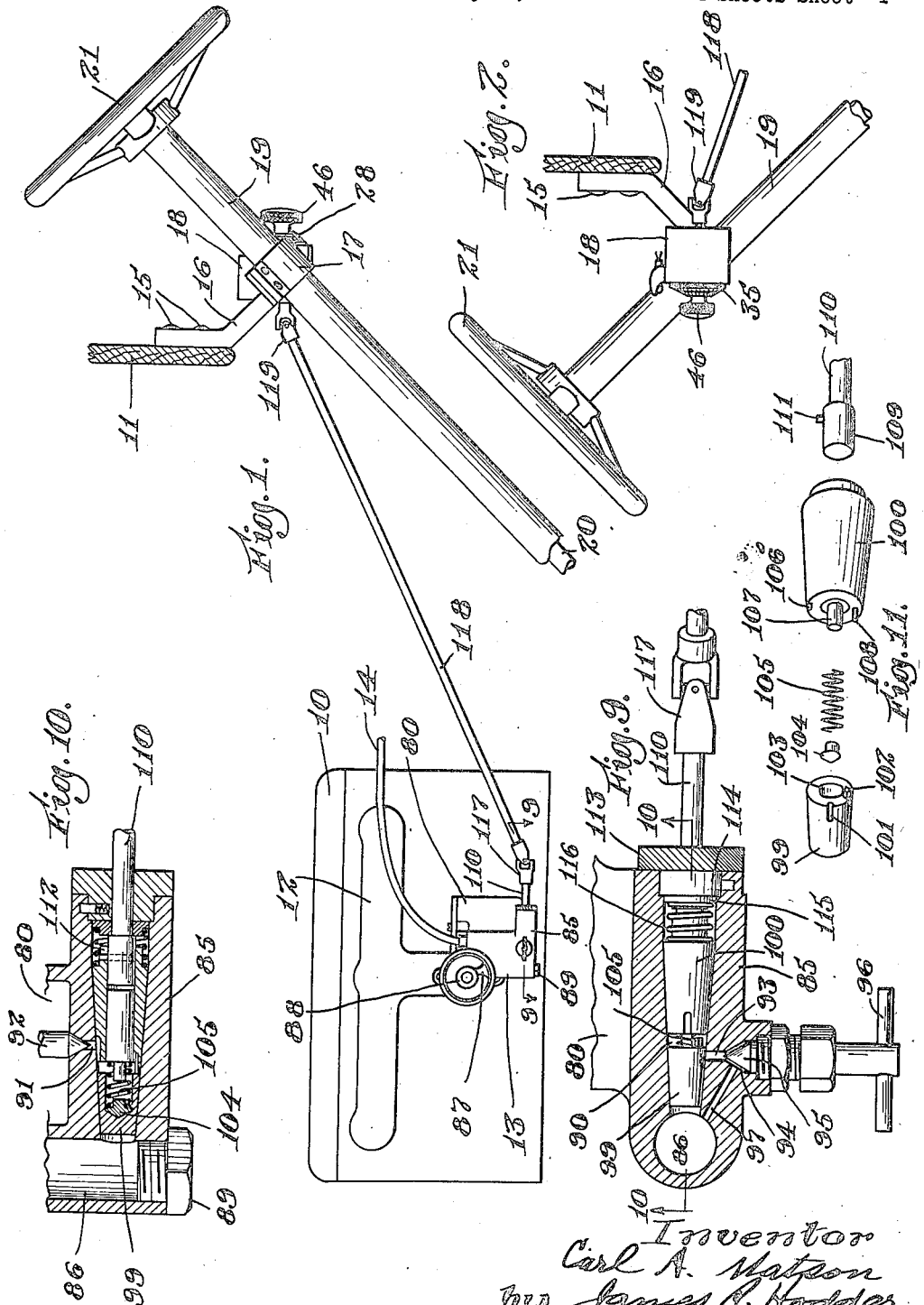

C. A. MATSON 1,691,774

SAFETY LOCKING DEVICE FOR AUTOMOBILES

Filed May 12, 1927     4 Sheets-Sheet 2

Inventor
Carl A. Matson
by James R. Hodder
Attorney

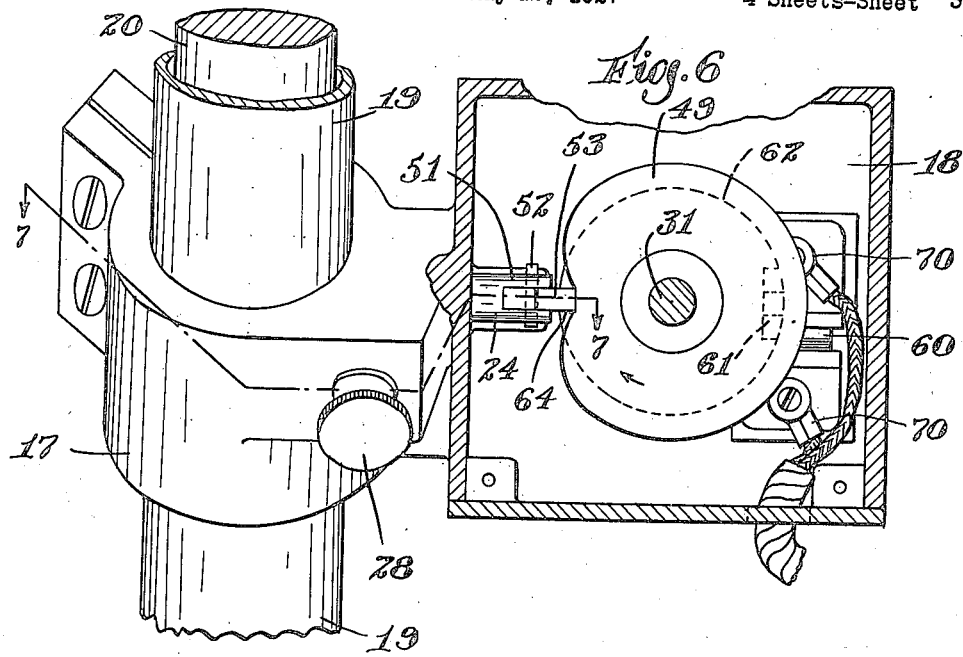
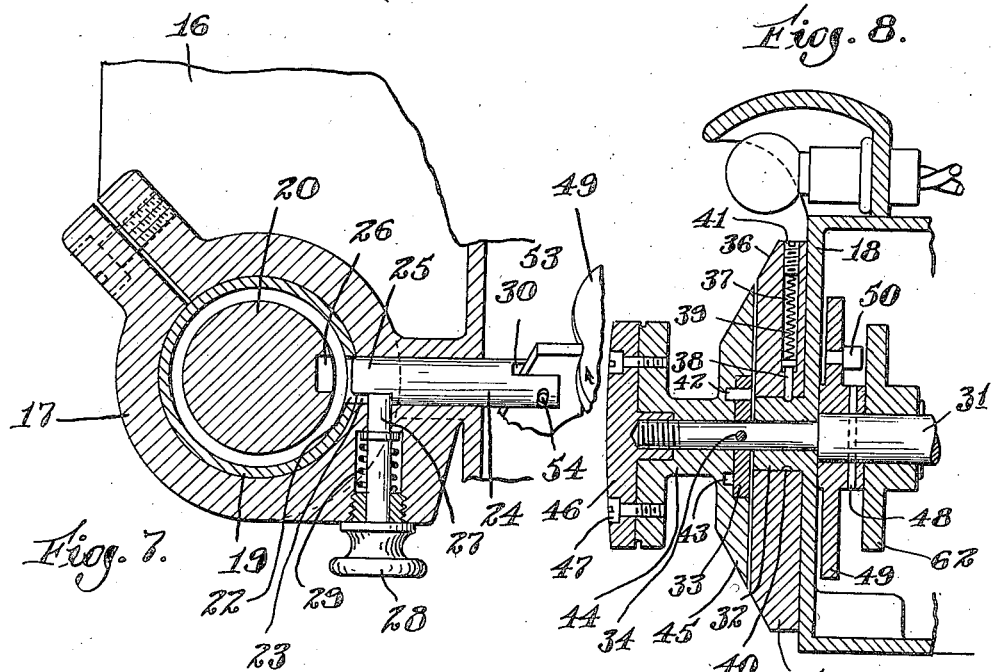

Nov. 13, 1928.
C. A. MATSON
1,691,774
SAFETY LOCKING DEVICE FOR AUTOMOBILES
Filed May 12, 1927 4 Sheets-Sheet 4
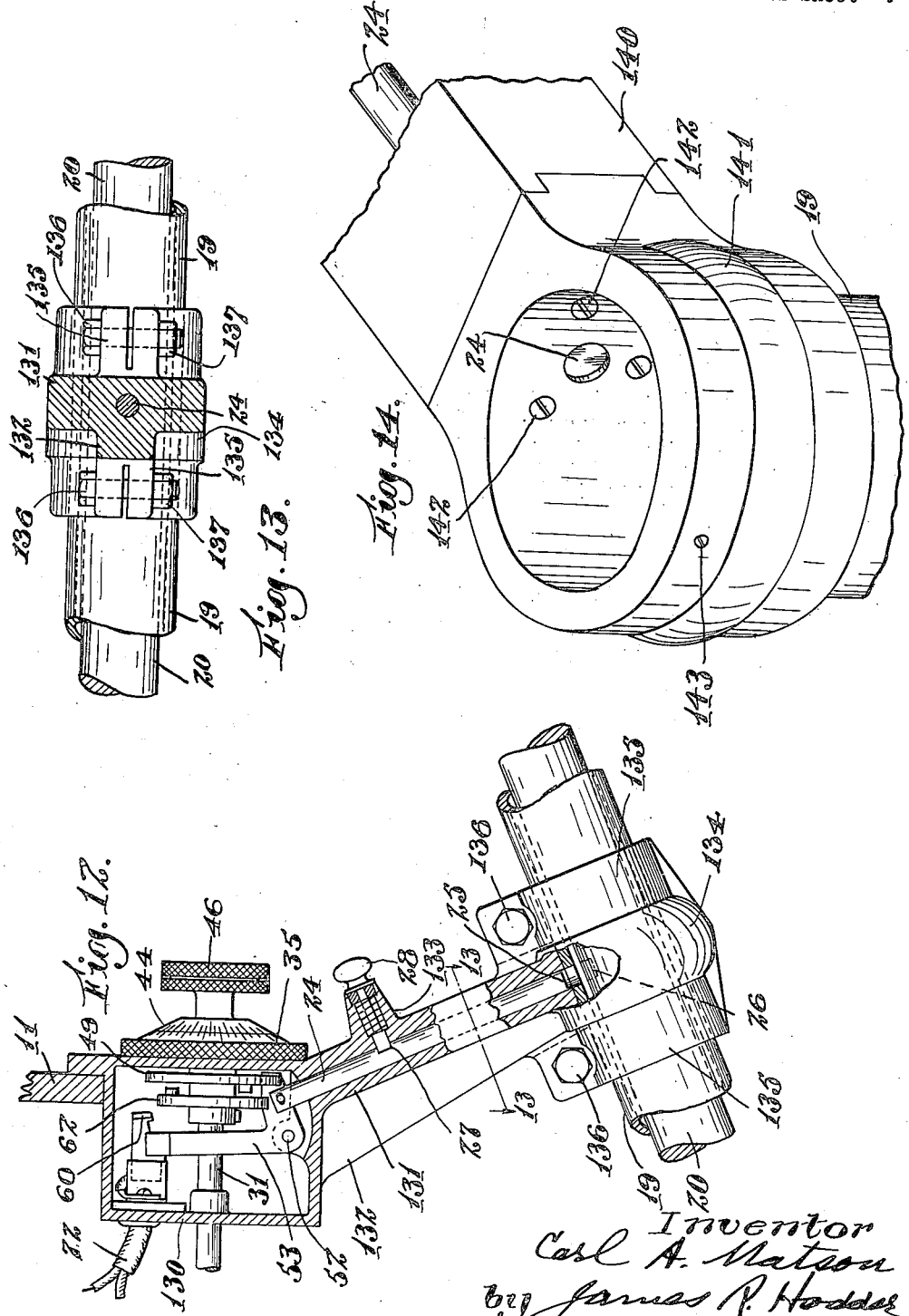

Patented Nov. 13, 1928.

1,691,774

UNITED STATES PATENT OFFICE.

CARL A. MATSON, OF LYNNFIELD, MASSACHUSETTS.

SAFETY LOCKING DEVICE FOR AUTOMOBILES.

Application filed May 12, 1927. Serial No. 190,755.

My present invention relates to locking devices, and more particularly to an improved safety locking device for automobiles and the like.

In my copending application for carburetor locks, Serial No. 160,500, filed January 11, 1927, I have described and claimed an improved locking means for a carburetor which effectually locks the carburetor to prevent flow of fuel from the fuel tank to the carburetor, and therefore, prevents the theft of the car. In such application, also, I have indicated means for controlling such carburetor locking means from the instrument board of a machine, such as an automobile.

With a view, however, of making an automobile or other like vehicle as near theft-proof as is possible, I have devised a means for locking not only the carburetor, but the ignition and steering post and combine all these features in a unitary controlling device and which will control the three instrumentalities referred to simultaneously.

In carrying out my present invention, I have utilized a device or lock, such as a permutation lock, and control thereby the ignition switch and a locking means for the steering post and simultaneously with the operation of the permutation device, I control the carburetor valve.

The object of my invention, therefore, is an improved anti-theft device or safety locking device for automobiles.

In the accompanying drawings illustrating preferred embodiments of my invention, Fig. 1 is a side elevation showing a steering post and carburetor and with an improved safety locking device mounted on or in connection with the steering post;

Fig. 2 is a side elevation of a portion of Fig. 1 and from the opposite side thereof;

Figure 3:
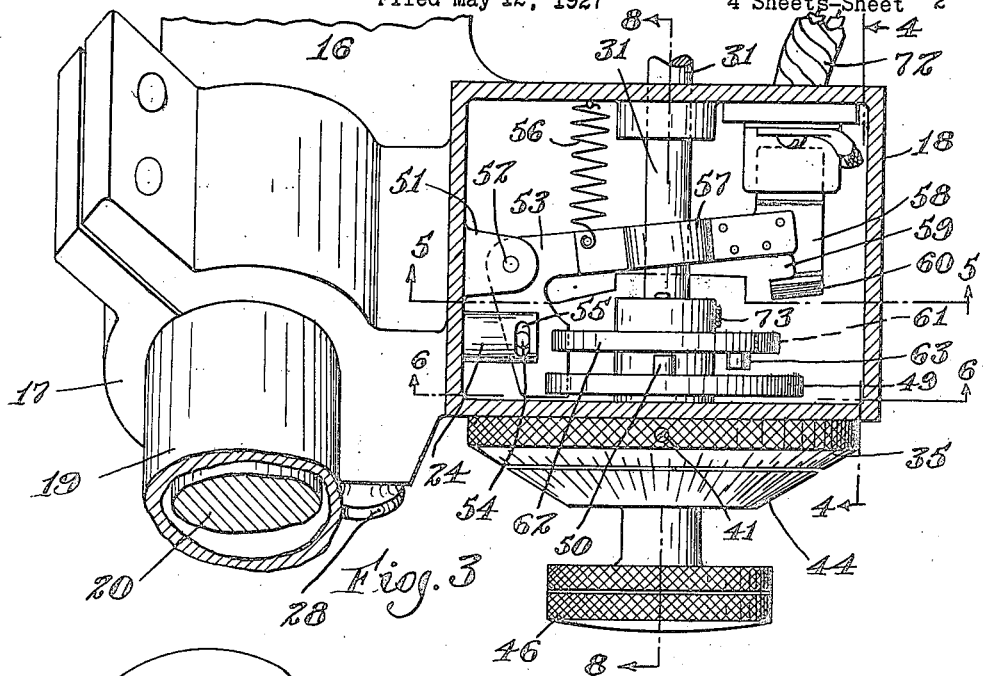
Fig. 3 is a plan view showing a portion of the steering post with the locking device clamped thereon, the lock being shown partially in section.
Figure 5:
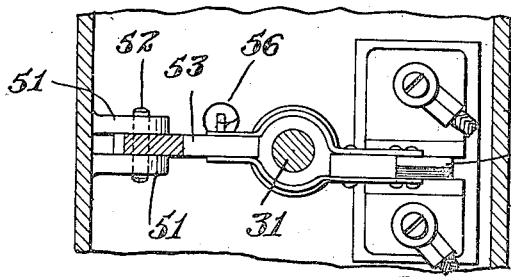

Fig. 5 is a section on the line 5—5 of Fig. 3;
Fig. 6 is a section on the line 6—6 of Fig. 3;
Fig. 7 is a section on the line 7—7 of Fig. 6;
Fig. 8 is a section on the line 8—8 of Fig. 3;
Fig. 9 is a section on the line 9—9 of Fig. 1;
Fig. 10 is a section on the line 10—10 of Fig. 9;
Fig. 11 is an expanded view of the valve shown in Figs. 9 and 10;

Fig. 12 is a side elevation, partly in section, of a modified form of my invention, showing a particular means for connecting the steering post holder with the enclosing casing;

Fig. 13 is a sectional view on the line 13—13 of Fig. 12, and

Fig. 14 is a perspective view of a still further modification of the connecting means for connecting the steering post and enclosing casing.

Referring to the drawings, 10 illustrates an engine, and 11 the instrument board of the usual automobile and in the relative positions they occupy with respect to each other and forming part of the engine is the intake manifold 12 to which is secured the usual carburetor 13, being connected by pipe 14 to a suitable source of fuel (not shown). Secured to the instrument board 11, by bolts or rivets 15, is a bracket 16 provided at its lower end with an integrally formed split bushing or lug 17, such lug having formed thereon and at one side thereof a substantially rectangular box 18, to be hereinafter described. Adjustably secured in the bushing or lug 17 is a sleeve 19, which forms an enclosing casing for a steering post 20 that has secured to its top end the usual steering wheel 21.

Within the limits of the lug or bushing 17, the tubular member 19 is provided with a perforation 22 which is in alinement with a corresponding perforation 23 in the body of the member 17 and the perforations 22 and 23 have slidably mounted therein a locking bar or pin 24, the outer end of which is reduced in size, as indicated at 25, and is adapted to fit into a depression 26 in the steering post 20, and when the reduced end 25 fits into the depression 26, the steering post 20 will be prevented from rotative movement and will, therefore, be locked against rotation until the reduced end 25 of the pin 24 is removed therefrom. The lug 17 is provided with a perforation in which is located a plunger 27, which plunger is provided with an operating handle 28 on its outer end and with a spring 29 which constantly urges the plunger 27 inward against either the reduced end 25 of the bar 24 or the bar 24 itself.

By referring to Fig. 7, it will be noted that with the bar 24 and the plunger 27 in the position shown, that the bar 24 will be prevented from moving to the left or into engagement with the depression 26 in the steering rod 27 and only after the plunger 27 is removed from engagement with the bar 24, will such bar be allowed to move to operated position. The outer end of the bar 24 or the end remote from the reduced portion 25 is forked as indicated at 30, for a purpose to be hereinafter described.

Rotatably mounted in the rectangular casing 18, is a shaft 31, which shaft is reduced at one end to receive a boss 32, which is secured thereto, and to receive a collar 33, such collar being also secured to the reduced end by pin 34.

Figure 4:
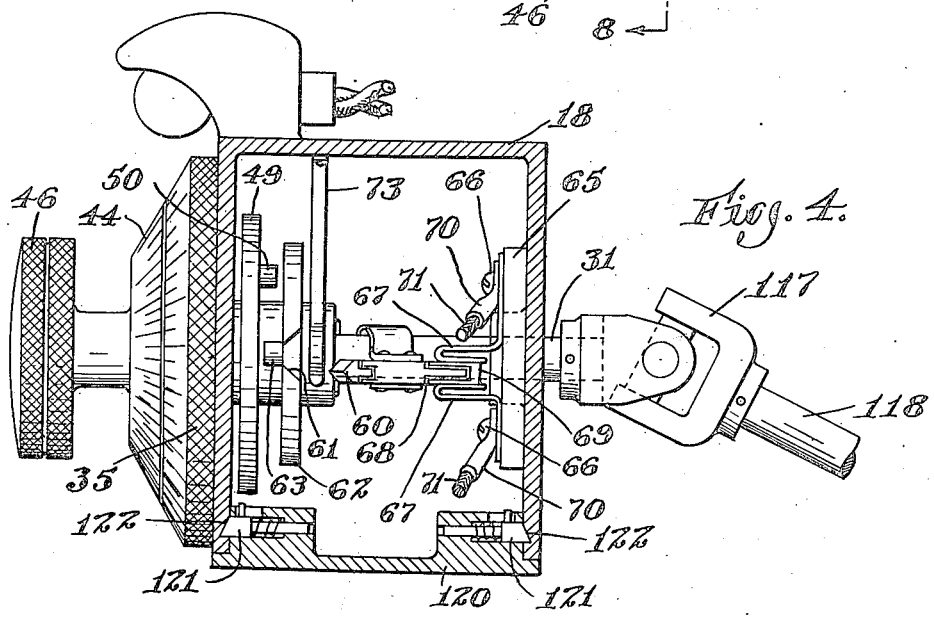
Fig. 4 is a sectional elevation on the line 4—4 of Fig. 3.

Referring to Fig. 8, it will be noted that the boss 32 has rotatably mounted thereon a member 35, such member 35 having a bevelled face 36 provided with graduations or other characteristic marks, and extending radially through the member 35 is a perforation 37. In the perforation and at the lower end thereof is a pin 38 and a spring 39 engages with said pin 38, urging the same downward into engagement with depressions 40 on the periphery of the sleeve 32. A plug 41 makes it possible to vary the tension of the spring 39. The pin 38, therefore, in association with the spring 39 and the depressions 40 in the sleeve 32, make it possible to adjustably rotate the member 35 on the sleeve 32 and have such member 35 remain in adjusted position. Secured to the collar 33 and extending outward from one face thereof is a pin 42, which is adapted to engage with one or the other of a plurality of depressions 43 formed in a member 44, which is mounted on the reduced end of the shaft 31, and lies adjacent to the member 35. This member 44 is provided with a bevelled face 45 provided with graduations or other characters, for a purpose to be hereinafter described. The outer reduced end of the shaft 31 is threaded to receive a cap member 46, which is secured to the outer end of the member 45 by screws 47. By the means just described, it is possible to vary the relative position of the member 45 and the shaft 31, this being accomplished by first removing screws 47 and then unscrewing the cap 46 from the threaded end of the shaft 31, sliding the member 45 longitudinally and to the left, as viewed in Fig. 8, on the reduced end of the shaft 31, rotating the same so as to bring another one of the depressions 43 into alinement with the pin 42 and replacing the elements in the manner above described. Within the casing 18 and secured to the shaft 31 by pin 48, is a disc 49, this disc being provided on one side with a longitudinally extending pin 50. Such disc 49 forms a cam, being a so called heart-shaped cam. Formed on one of the walls of the casing 18 and extending inwardly are spaced ears 51, on which is mounted for rotation on shaft 52 a bell crank lever 53. The short arm of the bell crank lever 53 is provided with a pin 54 which extends through a slot 55 on the forked end 30 of the locking bar 24, as clearly shown in Figs. 3 and 7. On rotating the shaft 31, by means of the member 44, the cam 49 is rotated and rocks the bell crank lever on the shaft 52 and simultaneously imparts a sliding movement to the locking bar 24, it being assumed for the moment that the plunger 27 is out of engagement with such bar. As the cam 49 is only able to impart movement to the bell crank lever 53 in one direction about the shaft 52, I have secured to the longer arm of such bell crank lever, one arm of a coil spring 56, the other end of this spring being secured to the wall of the casing 18. The long arm of the bell crank lever 53, has the outer end thereof composed of a member 57 that has secured thereto a bar 58. One end of this bar 58 is cut away at 59 and the end adjacent thereof is formed wedge-shaped, as indicated at 60. This wedge-shaped end 60 is adapted to engage with a corresponding wedge-shaped slot 61 formed on the periphery of a disc 62 that is rotatably mounted on the shaft 31. The disc 62 has secured to the face thereof opposing the disc 49 a pin 63, which is adapted to be engaged by the pin 50 on the disc 49, for a purpose to be hereinafter described. Diametrically opposite the wedge-shaped slot 61 is a slot 64, in which is adapted to fit one edge of the short arm of the bell crank lever 53. The bell crank lever 53, in order to be moved into the position shown in Fig. 3, must have the short arm thereof fitting into the slot 64 and into the lowest part of the heart-shaped cam 49, and when in this position, the locking bar 24 will have been moved to the right, as shown in Figs. 3 and 7, to thereby release the steering rod 20 and allow the same to be manipulated by the steering wheel 21. Secured to the inner face of a wall of the casing 18, is a block of insulation 65, to which is secured by screws 66, spring contacts 67 that are arranged parallel to but spaced apart from each other, as clearly shown in Figs. 4 and 5. Secured to the member 58 at the end remote from the wedge-shaped portion 60, and insulated therefrom by insulation 68, is a contact blade 69, which is adapted to engage with the spring contact 67 and complete a circuit therebetween. The contact blades 69 are each connected by means of terminals 70 to conductors 71, which conductors are located in a conduit 72, leading from a source of power and to the ignition devices of an automobile. When the bell crank lever 53 is, therefore, in the position shown in Fig. 3, the break point in the ignition circuit which occurs at the switch blades 67 is closed and the usual ignition switch of the automobile, if such has been retained, will be allowed to function. While the disc 62 is rotatably mounted on the shaft 31, it does not necessarily rotate therewith, as the hub of such disc is engaged by a spring friction member 73, which is secured to the inner wall of the casing 18, as shown in Fig. 4.

Referring now to Figs. 1, 2, 9, 10 and 11, 80 designates the float chamber of the carburetor 13. Forming part of the carburetor is a member 85. Formed in the member 85 is a vertical passage 86 communicating by a passage 87 with the annular chamber 88, formed in the carburetor. The lower end of the passage 86 is internally threaded to receive a threaded plug 89. At right angles to the passage 86 and in the member 85 is a tapered valve seat 90 and communicating with the valve seat 90 is a passage 91 leading from the interior of the float chamber 80, this passage 91 having a valve stem 92 associated therewith and controlled in the usual manner by the float (not shown) ordinarily located in the float chamber 80. Also communicating with the valve seat 90 and located substantially at right angles to the passage 91 is a passage 93, this passage terminating in the valve seat 94 that has associated therewith a valve 95 operated by a handle 96. Communicating with the valve seat 94 and, therefore, with the passage 93, is a passage 97 leading from the vertically arranged passage 86. The passage of fuel from the usual source of fuel supply is through the pipe 14 through a valve (not shown), controlled by the usual float into the float chamber 80, through the passage 91, the tapered valve seat 90, passage 93, passage 97, passage 86, passage 87, and into the annular chamber 88 and thence into the engine cylinders.

Rotatably mounted in the valve seat 90 is a compound valve comprised of members 99 and 100 respectively turned to fit the taper of the valve seat 90 and, when in position, being slightly separated from each other, as clearly shown in Figs. 9 and 10. The member 99 is provided adjacent its larger end with a longitudinal passage 101, which is adapted to be brought into or out of registry with the passage 93 and also this member 99 is provided at its larger end with a projection or lug 102. Also the member 99 is provided with a recess 103, in which fits a spring position plug 104 and a coil spring 105. The member 100 is provided at its smaller end with a longitudinal groove or passage 106 which is adapted to be brought into and out of registry with the passage 91, and also this member 100 on its smaller end is provided with an axial extension 107 adapted to act as a means for positioning the outer or free end of the coil spring 105. Further, this member 100 is provided on its smaller end with a lug or projection 108 adapted to engage with the lug or projection 102 on the member 99 and forms a means for rotating such member 99. The larger end of the member 100 is recessed to receive an enlarged end 109 of the shaft 110, such enlarged end being provided with a radially extending projection 111 engaging with a recess 112 in the member 100, and which will allow the member 100 to be rotated by the shaft 110. The outer end of the tapered valve seat 90 in the member 85 is recessed to receive the reduced end of a gland 113, spring locking devices 114 being provided on said gland and passing into the walls of the member 85 to securely lock the gland 113 against removal therefrom. The gland 113 is drilled to receive the shaft 110 as a sliding and rotating fit and between the inner end of the gland 113 and the outer end of the tapered plug member 100 is placed a spring centering device 115, this device being located within the open end of a coil spring 116, the other end of this spring surrounding the outer end of the plug member 100. The spring 116 yieldingly holds the plug member 100 in close engagement with the tapered valve seat 90 and the spring 105 yieldingly holds the plug member 99 also in yielding engagement with the tapered valve seat 90. Secured to the outer end of the shaft 110 is one end of a knuckle joint 117, such knuckle joint also having connected thereto a rearwardly and upwardly extending shaft 118, which terminates adjacent to the outer end of the shaft 31 that is rotatably mounted in the casing 18. Connecting the upper end of the shaft 118 and the shaft 31 is a knuckle joint 119. The mechanism within the casing 18 having once been assembled, is permanently locked against interference by a shutter plate 120 that fits into the open end of the casing 18. This shutter plate 120 is provided with spring pressed latches 121 which engage in appropriate notches 122 formed in the walls of the casing 18, so that, as will be obvious from an inspection of Fig. 4, when the shutter plate 120 is moved into position, the co-operating members 121 and 122 will serve to seal the contents of the casing 18 from any interference and it is not possible to remove said shutter plate 120 without wrecking both the plate 120 and the casing 18.

Assuming that the parts of the apparatus have been constructed and assembled as above described and that the parts are in the position as shown in the drawings, with particular reference to Figs. 3, 4, 6, 7 and 8, and that when thus arranged, fuel is passing from the pipe 14 into the carburetor and from thence into the engine, passing through the compound valve 99 and 100; also, that the switch blade 69 has completed contact between the contact 67 so that the ignition of the automobile is functioning; also that the locking bar 24 is out of engagement with the depression 26 in the steering rod 20 and, therefore, such steering rod may be manipulated by means of the steering wheel 21. Assume now that it is desired to stop the car, shut off the engine and place same in safe condition to insure it against theft or unauthorized use of the car. The operator will turn the member 44 either to the right or left, thus rotating the shaft 31, and such rotation should take place at least through ninety degrees. This operation will perform the following functions: The shaft 110 is, through the medium of the shaft 118, rotated so as to disaline the longitudinal passages in the plug members 99 and 100 with respect to the passages in the carburetor body and shuts off the flow of fuel from the pipe 14. The disc 49 is rotated, causing the heart-shaped cam to engage with and force outwardly the short arm of the bell crank lever 53, causing the locking bolt 24 to move to the left, as shown in the figures, and causing the reduced end 25 thereof to engage in the depression 26 in the steering rod 20, thus locking said steering rod against rotative movement. The bell crank lever 53 being rotated, will move the member 58 carried thereby, and therefore, the switch blade 69 out of engagement with the contacts 67 and breaking the ignition circuit through the conductors 71. The wedge-shaped end 60 of the member 58 will engage with the corresponding wedge shaped slot 61 in the disc 62 and will rotate said disc 62 slightly on the shaft 31, thus moving the radial slot 64 therein out of alignment with the short arm of the bell crank lever 53. This action prevents a return movement of the bell crank lever 53 and, therefore, keeps the steering rod 20 locked and the ignition circuit broken. Further, rotative movement of the bell crank lever 53 moves the wedge-shaped portion 60 to a point below the disc 62 so that such disc 62 will lie within the cut-away portion 59 of the member 58 and, therefore, rotative movement of the disc 62 may take place. The member 35 has graduations or other distinguishing marks thereon set to correspond with the proper positioning of the slot 64 in the disc 62 with respect to the short arm of the bell crank lever 53, and the lowest portion of the heart-shaped cam 49 is set with relation to any desired graduations on the member 44. Therefore, if it is desired to again put the automobile into condition to be operated, the operator will rotate the member 44 so as to bring the projection 50 on the disc 49 into engagement with the projection 63 on the disc 62 and will turn the same until it is properly positioned, this being determined by the graduations on the member 35. The operator will then rotate the member 44 in the reverse direction so as to bring the lowest part of the cam 49 into registry with the short arm of the bell crank lever 53. The spring 56 will, therefore, be allowed to act and will rotate the bell crank lever in an anti-clockwise direction about the shaft 52, thus bringing the blade 69 between and into engagement with the switch contacts 67, again completing the circuit for the ignition of the automobile and will move the locking bar 24 to the left, as viewed in the drawings, withdrawing the reduced portion 25 thereof from the depression 26, thus freeing the steering rod 20. During this rotation, also, the shaft 31 has been operated to operate through the medium of the shaft 118, the shaft 110 to bring the longitudinal passages in the members 99 and 100 into proper alinement with their respective passages to allow flow of fuel from the pipe 14 into the float chamber of the carburetor.

Referring now to Figs. 12 and 13, 11 designates the instrument board to which is attached an enclosing casing 130, which casing is a modified form of the enclosing casing 18 described with reference to the other figures. This casing carries the elements referred to in the preceding figures with slight modifications. Formed integral with the casing 18 and extending downwardly therefrom is a member 131 and the casing 130 and member 131 have formed integral therewith a strengthening rib 132, and also on the side opposite the rib 132 is a boss 133. Formed at the lower part of both the member 131 and rib 132 is an enlargement 134, which enlargement is hollow and of a size to receive the enclosing tube or sleeve 19 for the steering rod 20. Formed integral with the enlargement 134 and at each end thereof are split bushings 135, these split bushings being provided with bolts and nuts 136 and 137 respectively, such nuts and bolts being provided for the purpose of drawing the bushings 135 into clamping engagement with the tube 19. The member 131 and enlargement 134 are preferably made of steel that is spring hardened and this construction makes it impossible for a would-be-thief to pry the bushings 135 apart in a manner to destroy the utility of the enlargement 134 on the member 131, as might possibly be the case in a construction such as is disclosed, for example, in Fig. 3. The member 131 is drilled longitudinally to receive as a sliding fit the locking bar 24, the end 25 of which enters into the recess 26 in the steering post 20. The boss 133 is drilled and counterbored to receive the spring pressed plunger 27, which, in turn, is provided with the handle 28 and by means of which the same may be manipulated.

With this form of my device, there is no means by which the steering post rod 20 or tube 19 can be disassociated from the enlargement 134 of the member 131 and, therefore, once the locking bar 24 has been operated by the mechanism within the casing 130 to lock such steering post against rotation, it will remain in this condition until opened by an authorized person in possession of the combination for the permutation device associated with said casing.

Referring now to Fig. 14, wherein is shown a further modification of the connecting means between the casing 18 or 130, and the steering post tube 19 and steering rod 20, 140 designates a connecting piece formed integral with either the casing 18 or casing 130, and fitting into a groove in the outer or lower end of such member 140 is a corresponding key formed at one side of a hollow sleeve 141, which sleeve is preferably made of steel, spring hardened. The member 140, as well as the sleeve 141, is drilled to receive as a sliding fit the locking bar 24, such bar also being made of steel and hardened. The member 140 may or may not be made of hardened material, as if it should be attempted to saw through the member 130, the saw will be destroyed on contact with the hardened locking bar 24. The wall of the bushing 141 is drilled to receive and also the end of the member 140 is drilled and tapped to receive clamp screws 142. Within the hollow sleeve fits the steering post enclosing tube 19, and which tube may be held in desired position in any appropriate manner, as, for example, by a screw 143 passing through the wall of the bushing 141 and engaging with the tubular member 19. When assembled with the tube 19 and steering rod 18 within the bushing 141, the screws 142 are effectually sealed and cannot be tampered with until after the same are removed and this can only happen when a person in possession of the combination of the permutation device within the casing 130 operates the locking bar 24 to remove the same from the steering post 20.

While I have necessarily shown and described preferred embodiments of my invention somewhat in detail, it is to be understood that I may vary the size, shape, and arrangement of parts within wide limits without departing from the spirit of my invention.

Having thus described my invention, what I claim as new is:

1. In a device of the kind described, the combination of an enclosing casing, a permutation device, including a shaft extending through said casing mounted on and within said box, an ignition circuit having terminals located within and sealed in said casing, a steering rod, a locking device therefor sealed within said casing, a carburetor valve, controlling means therefor connected to and operated by said shaft, said permutation device associated with said shaft and simultaneously controlling the steering rod locking means, the ignition circuit, and said carburetor valve.

2. In a device of the kind described, the combination of an enclosing casing, a permutation device including a shaft extending through said casing mounted on and within said box, an ignition circuit having terminals located within and sealed in said casing, a steering rod, a locking device therefor sealed within said casing, a carburetor valve, controlling means therefor connected to and operated by said shaft, said permutation device associated with said shaft and simultaneously controlling the steering rod locking means, the ignition circuit and said carburetor valve, and a spring pressed manually operated device for permitting operation of the permutation device.

3. In a device of the kind described, the combination of an enclosing casing, a permutation device including a shaft extending through said casing mounted on and within said box, an ignition circuit having terminals located within and sealed in said casing, a steering rod, a locking device therefor sealed within said casing, a carburetor valve, controlling means therefor connected to and operated by said shaft, said permutation device associated with said shaft and simultaneously controlling the steering rod locking means, the ignition circuit and said carburetor valve, and a spring pressed manually operated device located without the casing for permitting the operation of the permutation device.

In testimony whereof, I have signed my name to this specification.

CARL A. MATSON.